United States Patent
Marwah et al.

(10) Patent No.: US 10,838,933 B2
(45) Date of Patent: Nov. 17, 2020

(54) PERIODIC PERFORMANCE OPTIMIZATION THROUGH HEATMAP BASED MANAGEMENT OF AN IN-MEMORY AREA

(71) Applicant: Oracle International Corporation, Redwood Shores, CA (US)

(72) Inventors: Vineet Marwah, San Ramon, CA (US); Amit Ganesh, San Jose, CA (US); Hariharan Lakshmanan, Belmont, CA (US); Prashant Gaharwar, San Mateo, CA (US); Dhruvil Shah, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 477 days.

(21) Appl. No.: 14/922,086

(22) Filed: Oct. 23, 2015

(65) Prior Publication Data

US 2017/0116232 A1    Apr. 27, 2017

(51) Int. Cl.
*G06F 7/00* (2006.01)
*G06F 16/21* (2019.01)

(52) U.S. Cl.
CPC ................... *G06F 16/217* (2019.01)

(58) Field of Classification Search
None
See application file for complete search history.

(56) References Cited

U.S. PATENT DOCUMENTS

| 7,669,029 B1* | 2/2010 | Mishra | G06F 11/3433 |
| | | | 711/112 |
| 9,384,227 B1* | 7/2016 | Xiao | G06F 16/278 |
| 2009/0106338 A1* | 4/2009 | Dunbar | G06F 7/586 |
| | | | 708/251 |

(Continued)

OTHER PUBLICATIONS

Lakshmanan, U.S. Appl. No. 16/144,926, filed Sep. 27, 2018, Office Action dated Mar. 25, 2020.

(Continued)

*Primary Examiner* — Eliyah S. Harper
(74) *Attorney, Agent, or Firm* — Hickman Palermo Becker Bingham LLP

(57) ABSTRACT

A method, apparatus, and system for periodic performance optimization through heatmap based management of an in-memory area are provided. A heatmap is maintained to track database accesses, and a sliding most recent time window of the heatmap is externalized to a desired granularity level to provide access statistics regarding candidate elements to be possibly placed in the in-memory area. Initially and on a periodic basis, an appropriate knapsack algorithm is chosen based on an analysis on the computational costs versus the benefits of applying various knapsack algorithms for the candidate elements. Using the chosen algorithm in conjunction with a selected performance model, an optimized configuration of the in-memory area is determined. The optimized configuration indicates a set of elements chosen from the candidate elements, optionally specified with compression levels. A task scheduler then (Continued)

schedules the appropriate tasks, working in a coordinated fashion, to reconfigure the in-memory area according to the optimized configuration.

29 Claims, 4 Drawing Sheets

(56) References Cited

U.S. PATENT DOCUMENTS

| | | | |
|---|---|---|---|
| 2012/0265738 A1* | 10/2012 | Beckmann | H03M 7/30 |
| | | | 707/693 |
| 2014/0195720 A1* | 7/2014 | Akella | G06F 16/10 |
| | | | 711/103 |
| 2016/0371190 A1 | 12/2016 | Romanovskiy | |
| 2018/0032430 A1 | 2/2018 | Malladi | |

OTHER PUBLICATIONS

Mishra, "Accelerating with Dynamic In-Memory Expressions", dated 2016, 12 pages.
Lahiri, "Oracle's In Memory Database Strategy for OLTP and Analytics", dated 2015, 17 pages.
Lahiri, "Oracle Database In-Memory: A Dual Format In-Memory Database", dated 2015, 6 pages.
Hadzi, "Application of Memory Database in Reporting of the Banking Information System", dated 2016, 6 pages.

* cited by examiner

202
RECEIVE AN ELEMENT LEVEL HEATMAP FOR A DATABASE, WHEREIN THE ELEMENT LEVEL HEATMAP COMPRISES ACCESS STATISTICS FOR A PLURALITY OF ELEMENTS WITHIN A MOST RECENT TIME WINDOW

204
SELECT A KNAPSACK ALGORITHM, FROM A PLURALITY OF AVAILABLE KNAPSACK ALGORITHMS, ACCORDING TO ONE OR MORE FACTORS

205
BASED AT LEAST ON THE ELEMENT LEVEL HEATMAP, USE THE KNAPSACK ALGORITHM TO ASSIGN TO EACH OF THE PLURALITY OF ELEMENTS A VALUE; WHEREIN THE VALUE ASSIGNED BY THE KNAPSACK ALGORITHM TO EACH ELEMENT REFLECTS: A PROJECTED PERFORMANCE BENEFIT FOR BEING IN AN IN-MEMORY STORE, AND A COST BASED ON A PROJECTED SIZE IN THE IN-MEMORY STORE

206
BASED ON THE VALUES ASSIGNED BY THE KNAPSACK ALGORITHM, CHOOSE A SET OF ELEMENTS, FROM THE PLURALITY OF ELEMENTS, FOR INCLUSION IN AN OPTIMIZED CONFIGURATION OF THE IN-MEMORY STORE

208
SCHEDULE ONE OR MORE TASKS TO CONVERT A PRESENT CONFIGURATION OF THE IN-MEMORY STORE TO THE OPTIMIZED CONFIGURATION

PERIODIC PERFORMANCE OPTIMIZATION THROUGH HEATMAP BASED MANAGEMENT OF AN IN-MEMORY AREA

FIELD OF THE INVENTION

The present disclosure relates to databases, and more specifically, to periodic performance optimization through heatmap based management of an in-memory area.

BACKGROUND

Dual-format database systems typically include copies of all data items in a database in one format, and copies of a subset of the data items of the database in another format. For example, U.S. patent application Ser. No. 14/337,179, which is incorporated herein by reference, describes a system in which copies of all data items are stored in row-major tables, and copies of a subset of the data items are also stored in column-major in-memory compression units (IMCUs).

Such in-memory compression units can be employed to provide a dramatic performance boost for many database workloads. For example, in a system that stores heavily-read data items in an in-memory column-major store (IMCS), during query execution, those data items may be retrieved directly from the IMCS rather than from the row-major store, resulting in faster retrieval operations. However, to effectively leverage the IMCS, it is necessary to intelligently select which elements (e.g. tables, partitions, columns, etc.) should be loaded into the IMCS, which is constrained in size by available memory resources. The database elements that are selected for loading into the IMCS are referred to herein as the "to-be-mirrored elements".

To determine which elements within the database should be included in the to-be-mirrored elements, one approach is to analyze performance statistics from test queries to determine an optimal or near-optimal subset of a database to load into the IMCS. However, this approach requires additional computational resources to perform test queries on the different schemas and only determines an optimal subset for a single point in time. Thus, as data access patterns change over time, the previously optimal subset may become stale and no longer appropriate. While the test query approach may be repeated periodically to refresh the contents of the in-memory area, the database administrator must still manually implement the recommended database schema conversion for each refresh, for example by executing conversion scripts during a maintenance period. Additionally, computational resources must be reserved to run new test queries for each refresh. As a result, the test query approach may be less suitable for maintaining the IMCS of a production database that experiences changing data access patterns over time.

Based on the foregoing, there is a need for an efficient way to automatically populate and maintain an in-memory area for a database, such as an in-memory columnar store (IMCS).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that depicts a process for periodic performance optimization through heatmap based management of an in-memory area, according to an embodiment;

DETAILED DESCRIPTION

Figure 1A:
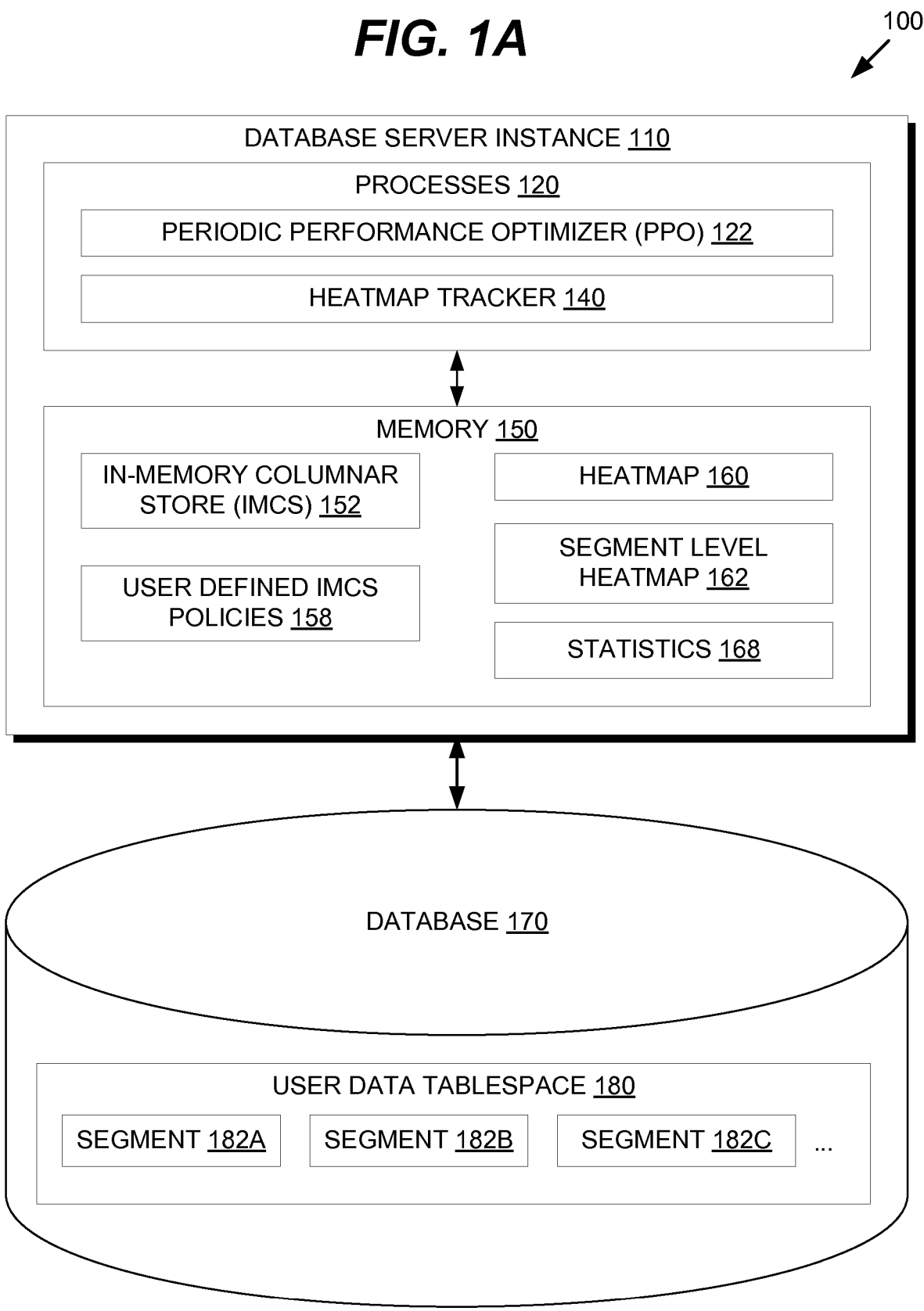
FIG. 1A is a block diagram that depicts an example database management system using periodic performance optimization through heatmap based management of an in-memory area, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a database management system ("DBMS") provides automatic selection of to-be-mirrored elements based, at least in part, on a heatmap. Specifically, a heatmap is maintained to track database accesses to all data in the database. According to one embodiment, a background process, referred to herein as a "periodic performance optimizer" (PPO), wakes up initially on database instance startup and periodically thereafter. Upon waking up, the PPO begins by examining a sliding most recent time window of the heatmap to determine access statistics regarding candidate elements. Candidate elements are a subset of all the elements in the database that are specifically marked as candidates for being to-be-mirrored elements. In an embodiment, candidate elements may correspond to segments of the database, which may include objects such as an entire database table, a partition of a table, or a subset of one or more columns of a table or partition of a table.

Once the access statistics for the candidate elements are known, the PPO selects an algorithm to select the to-be-mirrored elements from among the candidate elements, wherein the to-be-mirrored elements are selected to optimize the performance of the DBMS. The problem of selecting the to-be-mirrored elements is one specific example of the problem more generally known as the "knapsack problem". As described in "Knapsack problem", available from en.wikipedia.org/wiki/Knapsack_problem, given a knapsack with a fixed-size weight capacity and a set of items each having a weight (cost) and a value, the optimization problem is to select a collection of items from the set of items that maximizes a total value while remaining within the weight capacity. Thus, for the specific problem of optimizing an in-memory store for optimal database performance, the knapsack corresponds to the in-memory store and the set of items corresponds to the candidate elements. Algorithms for solving the Knapsack problem are referred to herein as "knapsack algorithms". Different knapsack algorithms have different computational costs and correctness guarantees. According to one embodiment, the PPO selects a suitable knapsack algorithm, from among multiple available knapsack algorithms, based on the difficulty of the knapsack problem and available computing resources. In addition to selecting the knapsack algorithm, a performance model may be selected independently of the selection of the knapsack algorithm. The selected knapsack algorithm may then be used in conjunction with the selected performance model to decide the optimal configuration for the in-memory store.

Specifically, once a knapsack algorithm and the performance model are selected, the PPO uses the knapsack algorithm and the performance model to determine an optimized configuration of the in-memory store. Optionally, the PPO may also determine target compression levels for each of the to-be-mirrored elements in the optimized configuration. User defined policies can be specified to override, on a per-element basis, the automatic optimizations that would normally be applied by the PPO for those elements.

According to one embodiment, the PPO utilizes a task scheduler to queue tasks that reconfigure the in-memory store according to the optimized configuration determined by the knapsack algorithm and performance model. At this point, the PPO has completed one optimization pass and the PPO process can sleep until the next periodic wake up, which proceeds in the same manner as described above.

In a multi-node DBMS, the PPO may also communicate the optimized configuration to remote nodes for synchronization. Thus, the techniques described herein for automatically selecting and dynamically changing the to-be-mirrored elements may be used both by a single node DBMS and a multi-node DBMS.

The techniques described herein for automatically selecting and dynamically changing the to-be-mirrored elements provide several technical advantages. First, unlike conventional caching approaches that require data to be read first before any caching can occur, the heatmap based approach can utilize prior access statistics to completely fill the empty in-memory area right at the startup of a database instance. In this manner, the database instance is primed for peak performance from the start.

Second, because the periodic performance optimization occurs without any manual intervention from the database administrator, maintenance of the in-memory area is greatly simplified. Moreover, because the periodic wakeup for the PPO can be adjusted manually or automatically, optimization overhead can be minimized while keeping the in-memory area up-to-date with the most recent data access trends.

Third, because the techniques described herein make use of the most appropriate knapsack algorithm for a given workload, limited processor and memory resources can be balanced against algorithmic correctness to provide best effort accuracy.

Fourth, besides the access benefits from placing elements with read-centric workloads in-memory, additional performance benefits can be attained by adjusting the compression level and the data format of the elements in the in-memory store, which may for example be an in-memory columnar store (IMCS).

Fifth, the updating of the in-memory store can be scheduled using a task scheduler to run in a coordinated fashion wherein element evictions are concurrently or immediately followed by element insertions, helping to ensure the full utilization of the maximum capacity of the in-memory store at all times.

Finally, the periodic performance optimization can be flexibly deployed to any DBMS that maintains access statistics and can also scale out to multi-node DBMSs.

Database Systems

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

A database dictionary, also referred to herein as a data dictionary, comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

A tablespace is a database storage unit that groups related logical structures together, and contains one or more physical data files. These logical structures may include segments, or an allocation of space for a specific database object such as a table, a table cluster, or an index. A segment may be contained in one data file or may span across multiple data files. A segment may be defined using a set of extents, where an extent contains one or more contiguous database blocks.

A database block, also referred to as a data block, is a unit of persistent storage. A database block is used by a database server to store database records (e.g. to store rows of a table, to store column values of a column). When records are read from persistent storage, a database block containing the record is copied into a database block buffer in volatile memory of a database server. A database block usually contains multiple rows, and control and formatting information, (e.g. offsets to sequences of bytes representing rows or other data structures, list of transactions affecting a row).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the command itself performs no actions, but rather the DBMS, upon executing the command, performs the corresponding actions. Thus, such statements as used herein, are intended to be shorthand for commands, that when executed by the DBMS, cause the DBMS to perform the corresponding actions.

In most cases, a DBMS executes database commands as one or more transactions, sets of indivisible operations performed on a database. Thus, after executing a given transaction, the database is left in a state where all the transaction's operations have been performed or none of the transaction's operations have been performed. While implementations may differ, most transactions are performed by, 1) beginning the transaction, 2) executing one or more data manipulations or queries, 3) committing the transaction if no errors occurred during execution, and 4) rolling back the transaction if errors occurred during execution. Consequently, a DBMS may maintain logs keeping track of committed and/or uncommitted changes to the database. For example, in some implementations of SQL, executing database commands adds records to REDO and UNDO logs, which can be used to implement rollback, database recovery mechanisms, and features such as flashback queries.

A multi-node database management system is made up of interconnected nodes that share access to the same database. Typically, the nodes are interconnected via a network and share access, in varying degrees, to shared storage, e.g. shared access to a set of disk drives and database blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

System Overview

FIG. 1A is a block diagram that depicts an example database management system using periodic performance optimization through heatmap based management of an in-memory area, according to an embodiment. Database management system 100 of FIG. 1A includes database server instance 110 and database 170. Database server instance 110 includes processes 120 and memory 150. Processes 120 include periodic performance optimizer (PPO) 122 and heatmap tracker 140. Memory 150 includes in-memory columnar store (IMCS) 152, user defined IMCS policies 158, heatmap 160, segment level heatmap 162, and statistics 168. Database 170 includes user data tablespace 180. User data tablespace 180 includes segment 182A, segment 182B, and segment 182C. While FIG. 1A depicts each of processes 120 as distinct processes, in alternative embodiments the functionality ascribed to processes 120 is not performed by separate dedicated processes. For example, in an alternative embodiment, the segment level heap map is tracked in memory as part of the database server instance 110's foreground processes, and the segment level heap map is flushed to disk by one of database server instance 110's background processes.

While database management system 100 only shows a single database server instance 110, embodiments may include multiple database server instances. Thus, database management system 100 may be a multi-node database system. Additionally, while database 170 only shows a single user data tablespace 180 with three segments 182A-182C, database 170 may store any number of tablespaces, each with any number of segments, for example hundreds or thousands of segments.

Database server instance 110 is a server instance of a database management system (DBMS). As database server instance 110 accesses and modifies data in database 170, including segments 182A-182C in user data tablespace 180, heatmap tracker 140 updates heatmap 160 to reflect the data accesses. Heatmap 160 may correspond to a block level heatmap, as described in "Tracking Row and Object Database Activity into Block Level Heatmaps", U.S. patent application Ser. No. 13/804,884 filed Mar. 14, 2013, the entire contents of which is hereby incorporated by reference as if fully set forth herein. However, heatmap 160 may also be a segment level heatmap or a heatmap at any other granularity level. Besides heatmap 160, other statistics 168 regarding database 170 may also be maintained by another process (not shown) of processes 120.

Periodic Performance Optimizer Overview

In the embodiment illustrated in FIG. 1A, database server instance 110 includes periodic performance optimizer (PPO) 122 that is responsible for initially populating, and periodically maintaining, the contents of the in-memory columnar store 153. Specifically, when database server instance 110 is started, IMCS 152 may be empty. In response, PPO 122 determines an initial set of elements for populating IMCS 152, using a process described in further detail below in conjunction with FIG. 1B and FIG. 2.

The database administrator may set the desired granularity of the elements to be stored in IMCS 152, for example, to segments, to sub-segments, to selective columns, to IMCUs (in-memory compression units), to arbitrary groups of database blocks, or to any other level of granularity. In the examples illustrated below, it may be assumed that the elements to be stored in IMCS 152 specifically correspond to segments, as shown by the presence of segment level heatmap 162. Thus, PPO 122 may execute to determine which of segments 182A-182C should be included in IMCS 152.

After IMCS 152 is initially populated, PPO 122 periodically wakes up and executes to determine the appropriate updates for IMCS 152, including adding new elements, evicting old elements, and modifying elements, for example by changing compression levels. Since PPO 122 examines a most recent sliding window of heatmap 160 for performance modeling, the updates will optimize IMCS 152 to adapt according to the most recent data access trends for database 170. The updates may be queued in a task scheduler, as described in further detail below under the heading "SCHEDULING TASKS TO APPLY THE OPTIMIZED CONFIGURATION".

Optionally, the database administrator may specify one or more user defined IMCS policies 158 on specific elements, which are evaluated prior to and override the automatic performance modeling rules used by PPO 122 for those specific elements. For example, if the database administrator is aware of certain elements that should always be stored in IMCS 152, or that certain elements should only be evicted from IMCS 152 after a specific period of inactivity, then these rules can be specified in user defined IMCS policies 158. More detailed examples of these user defined policies are described below under the heading "OPTIONAL USER DEFINED IN-MEMORY POLICIES". In this manner, the automatic performance modeling of PPO 122 can be supplanted by specific optimization strategies or policies that the database administrator may wish to implement.

Maintaining a Heatmap

Processes 120 also include heatmap tracker 140, a background process that tracks all data accesses to database 170 for maintaining heatmap 160. While heatmap tracker 140 is shown as a separate background process, the functionality of heatmap tracker 140 may alternatively be implemented in the foreground processes of the database server instance, the background processes of the database server instance, or using a combination of foreground and background processes of the database server instance. Heatmap 160 may include access statistics at any level of granularity, including block-level, segment-level, or multiple levels in a hierarchy. Examples of the access statistics in heatmap 160 may include, but are not limited to: a last accessed time (read), a last modified time (write), a number of accesses, a number of updates, a number of full table scan operations, a number of index lookups, and a number of row lookups. These access statistics may be aggregated into sequential time periods that are written as log entries in heatmap 160. Heatmap tracker 140 may maintain all entries or may purge the oldest entries from heatmap 160 to meet a specified age or size quota. While an in-memory heatmap 160 is shown in FIG. 1A, heatmap tracker 140 may also maintain an on-disk heatmap in database 170, for example within a data file of a reserved metadata tablespace or within a data dictionary.

Periodic Performance Optimizer Example

Figure 1B:
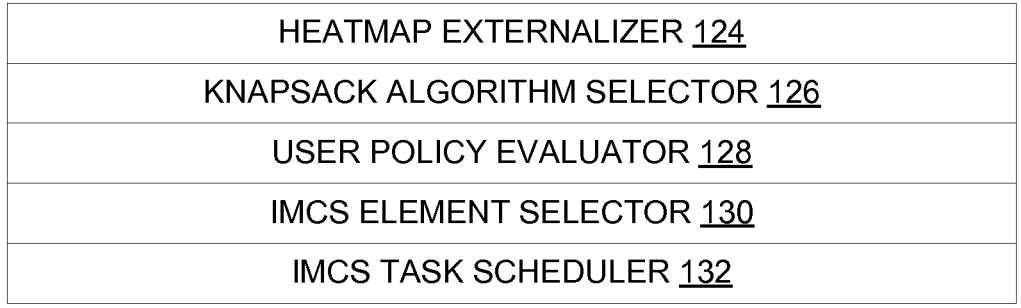
FIG. 1B is a block diagram that depicts example components of a periodic performance optimizer, according to an embodiment.

Referring to FIG. 1B, FIG. 1B is a block diagram that depicts example components of periodic performance optimizer (PPO) 122, according to an embodiment. PPO 122 includes heatmap externalizer 124, knapsack algorithm selector 126, user policy evaluator 128, IMCS element selector 130, and IMCS task scheduler 132. With respect to FIG. 1B, like numbered elements may correspond to the same elements in FIG. 1A.

Heatmap Externalizer

A high level overview of PPO 122 is provided below, with a more detailed description of PPO 122 described with FIG. 2 below. Initially, PPO 122 may invoke heatmap externalizer 124 to externalize heatmap 160 into a sliding most recent time window for analysis. This externalizing step serves at least a few purposes. For example, heatmap 160 may contain access statistics for a long period of time, potentially for the entire lifetime of database 170. Heatmap externalizer 124 may thus truncate heatmap 160 into a sliding most recent time window to focus only on the most recent data access trends. While heatmap externalizer 124 is described herein a separate component within a database server instance, the functionality of heatmap externalizer 124 may be implemented in any one of a virtually unlimited number of ways, including through the use of other foreground and/or background processes within the database server instance.

In some embodiments, heatmap 160 may be stored using a multi-level hierarchy or a granularity level that matches the to-be-mirrored elements to be stored in IMCS 152, in which case the access statistics for the candidate elements may be directly accessible from heatmap 160. However, alternative embodiments may maintain heatmap 160 only at a very low or fine grained level, such as the database block level. If heatmap 160 is such a fine grained heatmap, then heatmap externalizer 124 may aggregate heatmap 160 to a higher level, such as the segment level, to match the granularity of IMCS 152. Additionally, multiple consecutive entries in heatmap 160 may be aggregated, for example to combine many small time periods into a larger time block to facilitate analysis.

Figure 1C:
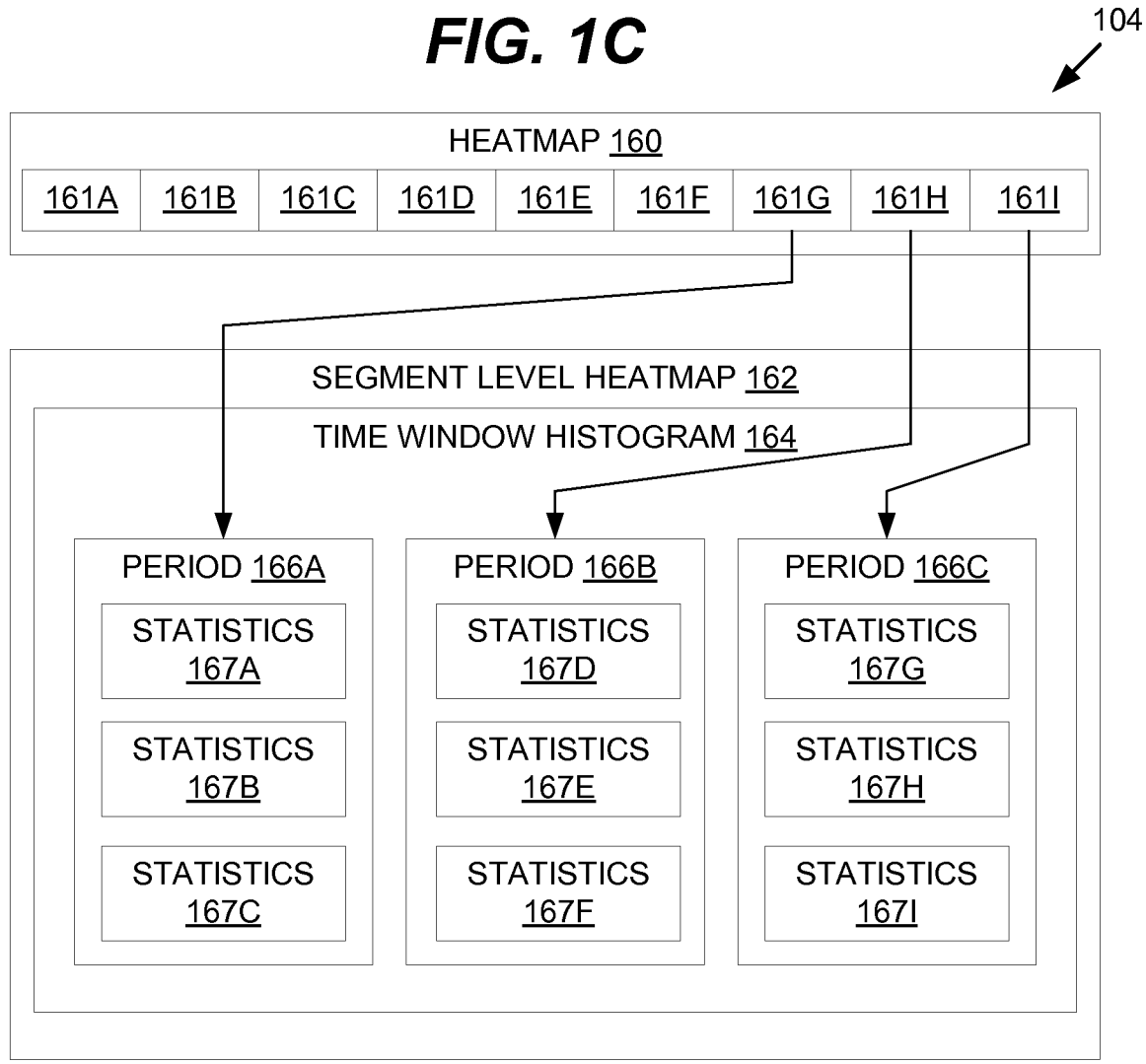
FIG. 1C is a block diagram that depicts a heatmap being externalized into an example sliding most recent time window, according to an embodiment.

For example, referring to FIG. 1C, FIG. 1C is a block diagram that depicts a heatmap being externalized into an example sliding most recent time window, according to an embodiment. System 104 of FIG. 1C includes heatmap 160 and segment level heatmap 162. Heatmap 160 includes entry 161A, entry 161B, entry 161C, entry 161D, entry 161E, entry 161F, entry 161G, entry 161H, and entry 161I. Segment level heatmap 162 includes time window histogram 164. Time window histogram 164 includes period 166A, period 166B, and period 166C. Period 166A includes statistics 167A, statistics 167B, and statistics 167C. Period 166B includes statistics 167D, statistics 167E, and statistics 167F. Period 166C includes statistics 167G, statistics 167H, and statistics 167I. With respect to FIG. 1C, like numbered elements may correspond to the same elements in FIG. 1A.

Each of entries 161A-161I may include access statistics for each and every element of database 170 that are aggregated for a specified time period, such as one minute. Accordingly, entries 161A-161I may represent access statistics for the last 9 minutes of database 170. To narrow the focus of analysis, a sliding time window is defined for the externalized heatmap, for example a 3 minute window. Thus, as shown in FIG. 1C, only three (3) entries, or entries 161G, 161H, and 161I are externalized into segment level heatmap 162. Statistics 167A, 167D, and 167G each correspond to statistics for segment 182A during respective periods 166A, 166B, and 166C, statistics 167B, 167E, and 167H each correspond to statistics for segment 182B during respective periods 166A, 166B, and 166C, and statistics 167C, 167F, and 167I each correspond to statistics for segment 182C during respective periods 166A, 166B, and 166C.

Note that the access statistics externalized into segment level heatmap 162 only concern candidate elements rather than all elements in database 170, as may be the case for heatmap 160. For example, the candidate elements may correspond to those segments 182A-182C that are marked with a metadata flag such as "in memory=true". This flag may be set manually by the database administrator or automatically by performing an analysis on the available data elements, wherein the analysis may be based on heatmap 160, statistics 168, or other criteria. The analysis to choose the candidate segments may itself use a selection process similar to that described in process 200, as described below. For simplicity, it may be assumed that each of segments 182A-182C are all marked with the "in memory=true" flag, and are thus all candidate elements.

Knapsack Algorithm Selector

PPO 122 may use knapsack algorithm selector 126 to determine the most appropriate knapsack algorithm for selecting the to-be-mirrored elements from the candidate elements. Once the candidate elements are known, knapsack algorithm selector 126 can select a knapsack algorithm based on the complexity of the knapsack problem and available computing resources. For example, a larger number of candidate elements may indicate a more complex optimization problem, in which case a faster knapsack algorithm may be favored over a more accurate but slower knapsack algorithm.

User Policy Evaluator

PPO 122 may use user policy evaluator 128 to apply user defined IMCS policies 158 from FIG. 1A prior to applying the chosen knapsack algorithm. User defined IMCS policies 158 are defined on a per-element basis, as described in more detail below under the heading "OPTIONAL USER DEFINED IN-MEMORY POLICIES". For example, one such policy may be defined by the statement "ALTER TABLE UserTable1 IN_MEMORY_EVICTION AFTER 90 DAYS OF NO ACCESS". This policy would specify that the segment containing the database table "UserTable1" should not be evicted from IMCS 152 unless 90 days of no access has occurred. Accordingly, user policy evaluator 128 can analyze heatmap 160 and/or segment level heatmap 162 to determine whether the condition in the user defined policy has triggered, and if so, to perform the corresponding action. In the above example, user policy evaluator 128 would cause an eviction the "UserTable1" segment from IMCS 152 after 90 days of no access. This eviction can be queued using a task scheduler in a manner similar to IMCS element selector 130, as described below.

User defined IMCS policies 158 should override any automatic optimizations that would have normally been carried out for the elements associated with the policies. Thus, for above example policy, IMCS element selector 130 will not create an automatic optimization task to evict the "UserTable1" segment, since the user defined eviction policy for the "UserTable1" segment should override any automated eviction decisions. However, IMCS element selector 130 may still automatically select the "UserTable1" segment for placement into IMCS 152, since no user defined selection policy is specifically defined for the "UserTable1" segment. Supplying user defined IMCS policies 158 is optional and a database administrator may omit them to fully automate the maintenance of IMCS 152.

IMCS Element Selector

PPO 122 may use IMCS element selector 130 to determine the to-be-mirrored elements for IMCS 152 of FIG. 1A. According to one embodiment, a performance model may be selected. Alternatively, a performance model may be created based on segment level heatmap 162. Based at least in part on the performance model, the value (estimated performance benefit) and weight (cost to store within IMCS 152) can be estimated for each candidate element, or segments 182A-182C in this example. More details about this performance model are described below under the heading "DETERMINING AN OPTIMIZED CONFIGURATION OF THE IN-MEMORY STORE". Optionally, PPO 122 may also determine optimal target compression levels for each of the to-be-mirrored elements. By applying the algorithm chosen by knapsack algorithm selector 126 to the selected performance model, an optimized configuration of IMCS 152 can be determined.

IMCS Task Scheduler

PPO 122 may use IMCS task scheduler 132 to queue tasks that reconfigure IMCS 152 to contain the to-be-mirrored elements determined from IMCS element selector 130. These tasks are queued in a coordinated fashion to avoid asynchronous updates that may impair the continuous and full utilization of the entire capacity provided by IMCS 152. For example, flushing tasks should not be queued unless a concurrent or subsequent insertion task closely follows to quickly repopulate IMCS 152. These tasks may be carried out by a general purpose task scheduler of database server instance 110, which is not specifically shown.

After IMCS task scheduler 132 finishes, PPO 122 may sleep until the next periodic execution of PPO 122 is scheduled. For example, PPO 122 may be configured to periodically wakeup and execute once every 30 minutes to ensure that IMCS 152 is updated to track the most recent data access trends. Note that this period may or may not coincide with the length of the sliding time window used for segment level heatmap 162. Since each execution of PPO 122 requires computational resources, the periodic wakeup should be adjusted to keep IMCS 152 optimally updated while balancing overhead costs. Thus, the database administrator may manually adjust the period for PPO 122, or the period may be automatically adjusted by analyzing estimated execution times for PPO 122 and the projected rate of change for data access patterns in database 170. This rate of change may, for example, be estimated by observing prior lifecycle data for database 170 or by examining lifecycle data for a similar database workload.

Process Overview

With a basic outline of database management system 100 and PPO 122 now in place, it may be instructive to review a high level overview of the processing steps to perform periodic performance optimization through heatmap based management of an in-memory area. Turning to FIG. 2, FIG. 2 is a flow diagram that depicts a process 200 for periodic performance optimization through heatmap based management of an in-memory area, according to an embodiment.

Receiving an Element Level Heatmap

At block 202 of process 200, referring to FIG. 1A and FIG. 1C, database server instance 110 uses heatmap externalizer 124 to receive segment level heatmap 162 for database 170. As discussed above, this receiving may be in response to determining that IMCS 152 is empty, indicating that database server instance 110 has been newly started, or in response to a periodic wakeup, which can be adjusted by the database administrator. Database server instance 110 invokes heatmap externalizer 124 to externalize segment level heatmap 162 from heatmap 160, thereby providing access statistics for the candidate elements to be considered.

In segment level heatmap 162 of FIG. 1C, a time window histogram 164 is provided, which divides the sliding time window into smaller time periods. For example, period 166A-166C may each correspond to successive one minute periods within a sliding time window of 3 minutes. The division into one minute periods is arbitrarily selected here and any period may be selected. Additionally, the time window may be set to any desired length. In alternative embodiments, segment level heatmap 162 may only include a cumulative set of statistics for the entire time window rather than the more detailed time window histogram 164.

In the example shown in FIG. 1C, assuming that the latest update to heatmap 160 was at 12:03:00 and the sliding time window is defined to be 3 minutes long, period 166A may correspond to (12:00:00, 12:01:00], period 166B may correspond to (12:01:00, 12:02:00], and period 166C may correspond to (12:02:00, 12:03:00]. Statistics 167A, 167D, and 167G may each correspond to statistics for segment 182A during respective periods 166A, 166B, and 166C. Statistics 167B, 167E, and 167H may each correspond to statistics for segment 182B during respective periods 166A, 166B, and 166C. Statistics 167C, 167F, and 167I may each correspond to statistics for segment 182C during respective periods 166A, 166B, and 166C.

Note that since time window histogram 164 is divided into multiple smaller time periods 166A-166C, a weighting may also be utilized for each period. For example, a weighting coefficient of 0.5, 0.8, and 1.0 may be applied to the values in statistics 167A-167C, 167D-167F, and 167G-167I in respective periods 166A, 166B, and 166C. In this manner, heatmap statistics from a more recent time period can be favored with a greater weighting when compared to older heatmap statistics.

Selecting a Knapsack Algorithm

At block 204 of process 200, referring to FIG. 1A and FIG. 1B, database server instance 110 uses knapsack algorithm selector 126 to select a knapsack algorithm, from a plurality of available knapsack algorithms, according to one or more factors. Knapsack algorithm selector 126 may evaluate the various approaches available to solve the knapsack problem as applied for the specific data set presented by segment level heatmap 162. Thus, before creating a performance model to solve the knapsack problem of selecting the to-be-mirrored elements for IMCS 152, block 204 may first choose an appropriate knapsack algorithm according to the complexity of the selection problem at hand.

Since the knapsack problem is computationally difficult (NP-hard), it is important to select an algorithm that can solve the problem within a reasonable amount of time. Algorithms such as dynamic programming and meet-in-the-middle can provide guaranteed correctness but are also the most computationally complex. Approximation algorithms, such as greedy approximation, can provide a near optimal solution with less computational complexity. To weigh the complexity of the knapsack problem against available computing resources, the one or more factors considered in block 204 may include:
- an amount of free memory available for PPO 122 to use in memory 150;
- a capacity of IMCS 152;
- a quantity of candidate elements to consider, which may be further pruned to a smaller number due to one or more overriding user defined IMCS policies 158;
- an on-disk size of the candidate elements to consider in database 170.

With these factors, a good estimate can be made as to the complexity of the knapsack problem. If the knapsack problem is more complex, as indicated by a large number of candidate elements to consider (e.g. thousands or more) and a large capacity for IMCS 152 (e.g. hundreds of gigabytes), then a high performance knapsack algorithm may be favored to provide a quick best estimate answer, even if correctness may not be guaranteed. One example of such a high performance knapsack algorithm is the multi-path greedy knapsack algorithm described in "Automatically Determining an Optimal Database Subsection", U.S. patent application Ser. No. 13/842,843 filed Mar. 15, 2013, the entire contents of which is hereby incorporated by reference as if fully set forth herein. On the other hand, if the knapsack problem is relatively simpler, as indicated by a smaller number of candidate elements to consider (e.g. hundreds or less) and a smaller capacity of IMCS 152, then it may be feasible to select a knapsack algorithm with less computational efficiency but greater guaranteed correctness, such as a dynamic programming approach.

Besides the factors discussed above, additional factors can also be considered including:
- an uncompressed size of the candidate elements to consider;
- a projected size of the candidate elements to consider when stored in IMCS 152;
- an estimated execution time of the knapsack algorithm for the candidate elements.

These additional factors may be determined by referencing one or more translation lookup tables or by sampling data, applying predictive analysis, using heuristics, or other approaches.

Optional User Defined in-Memory Policies

Before block 205 begins, user policy evaluator 128 may execute to evaluate any optional user defined IMCS policies 158 that may exist. Thus, the optimized configuration for IMCS 152 may be initially based on user defined IMCS policies 158, which may be specified on a per-element basis and may follow a syntax similar to that described in "Policy Driven Data Placement and Information Lifecycle Management", U.S. patent application Ser. No. 13/804,394 filed Mar. 14, 2013, the entire contents of which is hereby incorporated by reference as if fully set forth herein. Since the granularity level for IMCS 152 has been chosen to correspond to database segments, the user defined IMCS policies 158 are also defined on a per-segment basis.

For example, one example policy in user defined IMCS policies 158 may read: "ALTER TABLE UserTable1 IN_MEMORY_EVICTION AFTER 90 DAYS OF NO ACCESS". UserTable1 may be an important operational table and thus the database administrator may wish to preferentially keep UserTable1 in-memory unless there is an extended period of inactivity. Thus, a policy for evicting a segment according to explicit criteria is defined. Besides defining policies for evicting elements from IMCS 152, policies can also be defined for adding elements into IMCS 152 and converting elements within IMCS 152, for example between different compression levels.

To evaluate the above example policy, assuming that segment 182A contains the database table UserTable1, user policy evaluator 128 may first check to see if segment 182A is in IMCS 152. If so, user policy evaluator 128 may proceed to look in segment level heatmap 162 and/or heatmap 160 to determine the last access time for segment 182A. If this last access time is 90 days ago or older, then segment 182A may be queued for eviction from IMCS 152 in accordance to the policy. Otherwise, no action is taken and segment 182A remains in IMCS 152. Whether or not any action is taken for segment 182A, segment 182A is removed from consideration as a candidate for eviction when using IMCS element selector 130. After user policy evaluator 128 evaluates all of the policies defined in user defined IMCS policies 158, if any, then process 200 can proceed to block 205.

Assigning Values to Candidate Elements

At block 205 of process 200, referring to FIG. 1A and FIG. 1B, database server instance 110 uses IMCS element selector 130 to apply the knapsack algorithm selected from block 204 to assign, based at least on the element level heatmap and the selected performance model, a value to each of the candidate elements that reflects: a projected performance benefit for being in IMCS 152, and a cost based on a projected size in IMCS 152. Thus, the knapsack algorithm essentially uses the selected performance model to assign candidate elements are assigned values according to their projected performance benefits, and costs according to their projected cost to store in the in-memory store (or mass/weight in the traditional knapsack analogy).

More specifically, some level of performance benefit can be expected by placing an element in IMCS 152 since database server instance 110 can now directly read the element from memory 150 in an optimized format. In the example shown in FIG. 1A, this optimized format is specifically a columnar format (as opposed to a traditional row format), which can accelerate the processing of many read heavy workloads. The precise level of the performance benefit can be more concretely quantified by examining recent access statistics for that element, as described in segment level heatmap 162.

Elements are also assigned costs according to their projected size within IMCS 152, which can be ascertained by using lookup tables or other methods as described above. Additional costs may also be incurred to convert the elements into appropriate data formats and/or compression levels in IMCS 152. A more detailed description of this performance model is provided below in conjunction with block 206.

Determining an Optimized Configuration of the in-Memory Store

At block 206 of process 200, referring to FIG. 1A and FIG. 1B, database server instance 110 uses IMCS element selector 130 to choose, based on the values assigned by the knapsack algorithm in block 205, a set of elements (to-be-mirrored elements) from the candidate elements for inclusion in an optimized configuration of IMCS 152. The candidate elements may be selected from elements of database 170 that are specifically marked with an "in memory=true" flag that do not have any overriding policies within user defined IMCS policies 156.

Values in the Performance Model

As discussed above, the knapsack algorithm is used, in conjunction with a selected performance model, to assigns values and costs (weights) to each of the candidate elements, or segments 182A-182C in this example. The values are assigned according to at least the access statistics available in segment level heatmap 162. Each of statistics 167A-167I may include one or more access statistics regarding the associated element (segment) that are aggregated for the associated time period, including but not limited to:
- a last accessed time (read);
- a last modified time (write);
- a number of accesses (reads);
- a number of updates (writes);
- a number of full table scan operations;
- a number of index lookups;
- a number of row lookups.

Candidate elements that are hot or indicating a large number of accesses will be more valuable than candidate elements that are cold or indicating a fewer number of accesses. Additionally, the type of access is also important. For example, when the in-memory store is specifically an in-memory columnar store (IMCS) as with IMCS 152, candidate elements that experience predominately read heavy workloads stand to benefit much more than candidate elements that experience modification heavy workloads. While these examples only focus on the aggregated read and write (modify) access statistics for each candidate element, other statistics from heatmap 160 and other data sources, such as statistics 168, can also contribute as factors that affect the final values in the performance model.

Since an ideal candidate for IMCS 152 may be data with heavy read-centric workloads, a large number of accesses may contribute a proportionally large amount to the value assigned to the candidate element in the performance model. Conversely, a large number of writes may indicate that the data is still in an early data lifecycle phase where many modifications are made to the data, in which case the data may be less suitable for storage in columnar format as in IMCS 152. In some embodiments, a ratio of the number of accesses to the number of updates may be used to assign the value. Any other access statistic as listed above for statistics 167A-167I may also be used to assign or modify the values in the performance model. Thus, the values assigned to candidate elements may be modified by the particular characteristics of the in-memory store, which happens to be an in-memory columnar store in this example.

Besides the access statistics listed above, the values in the performance model may be scaled according to the size of each element. Obviously, not every element in database 170 will necessarily be the same size. An element that corresponds to a large table may have a greater potential value than another element that corresponds to a small table, and therefore the larger element can be scaled in value accordingly.

Optionally, additional considerations may be made in the performance model in addition to the decision to include or exclude a particular element in IMCS 152. For example, the performance model may also select the appropriate optimal compression level for each to-be-mirrored element that is selected for IMCS 152. An element that still has some level of write activity may be preferred to be stored using a more lightweight compression level, such as a simple run-length encoding (RLE). On the other hand, an element that is almost exclusively reads may be preferred to be stored using a higher compression level, such as a dictionary based encoding. As a result, the optimized configuration of IMCS 152 may specify that existing elements are to be modified by transitioning from one compression level to another, rather than being evicted from IMCS 152.

Note that the performance model assigns values to candidate elements regardless of whether the candidate elements were evicted in the past. As a result, previously evicted elements may still be loaded again in the future, depending on changing data access patterns. For example, if a business audit is required, older data may suddenly require a large number of read accesses that are reflected in segment level heatmap 162, which in turn results in the older data being selected for loading into IMCS 152.

Weights or Costs in the Performance Model

Besides values, costs are also assigned to each of the candidate elements in the performance model. In some embodiments, the assigned values may be adjusted by the assigned costs to generate a single final value that reflects both the value and cost for each candidate element.

With regards to the weight or cost of each candidate element, at least one factor is the projected size or memory footprint of each candidate element when stored in the in-memory store. Another possible factor is the projected computational time or projected execution time needed to convert each candidate element into a suitable data format when stored in the in-memory store. Note that a projected size and a projected computational time is used rather than the actual values, since an actual conversion process may be necessary to obtain exact values, which may be impractical to perform for all candidate elements. Based on at least the projected size and the projected execution time, a weight or cost can be assigned to each candidate element in the performance model. Note that other factors may also be considered when determining the cost of each candidate element.

For example, candidate elements may be stored on disk at a certain compression level using a certain format, such as a row-major format. To convert these candidate elements for storage into an in-memory columnar store (IMCS), the candidate elements must undergo a number of processing steps, which include reading the candidate elements from disk, decompressing the candidate elements, converting the candidate elements from a row-major format into a column-major format at a specific compression level, and writing the candidate elements into the in-memory store. To estimate the projected final memory size and the projected computational cost for these processing steps, one or more lookup tables, embedded metadata, heuristics, and other data sources may be analyzed.

Once the values and costs are assigned according to the performance model, then the selected knapsack algorithm from block 204 may be applied to determine an optimized configuration of IMCS 152 with the set of elements appropriately selected from the candidate elements.

Scheduling Tasks to Apply the Optimized Configuration

At block 208 of process 200, referring to FIG. 1A and FIG. 1B, database server instance 110 uses IMCS task scheduler 132 to schedule one or more tasks to convert a present configuration of IMCS 152 to the optimized configuration determined in block 206. When PPO 122 is initially woken up upon the startup of a database instance, the in-memory area is empty and an optimal configuration of the in-memory area can be accomplished by straightforwardly queuing element insertion tasks for each of the to-be-mirrored elements. However, if PPO 122 is being woken up at a later periodic time, then old elements will already exist in IMCS 152 and PPO 122 will need to determine the appropriate tasks to provide the optimal configuration of IMCS 152, which may include:
  adding a particular element into IMCS 152;
  evicting a stale element from IMCS 152 (i.e. an element that is in IMCS 152 but is not in the set of elements determined in the optimized configuration);
  converting an existing element in IMCS 152 to a specific compression level.

The specific tasks that need to be carried out may be determined by comparing the present configuration of IMCS 152 with the optimized configuration determined in block 206. Insertion tasks should be queued for any to-be-mirrored elements that do not exist in the in-memory area, eviction tasks should be queued for any old elements in the in-memory area that do not exist in the to-be-mirrored elements, and conversion tasks should be queued for any old elements that have been specified a new optimal compression level.

As discussed above, these tasks may be executed in a coordinated fashion to ensure optimal utilization of IMCS 152. For example, IMCS task scheduler 132 may coordinate eviction tasks to be closely followed by insertion tasks to maximize a utilization of IMCS 152 to its fullest capacity. In this manner, situations where evictions occur with a large time gap before repopulating can be avoided in IMCS 152. Additionally, database components such as the query optimizer may be notified of potential changes to IMCS 152 in advance, allowing the query optimizer to prepare in advance for the removal or addition of elements in IMCS 152.

Considerations for Multi-Node Databases

While the above examples have focused on a single-node embodiment shown in FIG. 1A, PPO 122 is equally applicable to multi-node databases. For example, one approach is to determine optimal configurations of the in-memory stores at the local scope for each node of the multi-node database, in the same manner described above for process 200. These locally determined optimal configurations can then be communicated to remote database instances at remote nodes, for example by queuing additional remote synchronization tasks in block 208, to cause a global synchronization of the in-memory store updates. The specific remote nodes to synchronize with may depend on the particular distributed computing model being utilized. For example, if each node replicates a copy of the entire database, then the locally determined optimal configuration should be sent to all remote nodes. On the other hand, if shards are utilized wherein nodes are only responsible for certain portions of the database, then the locally determined optimal configuration can only sent to the remote nodes that require synchronization. This is only one possible approach to extending PPO 122 for multi-node databases; alternative approaches may also be pursued.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
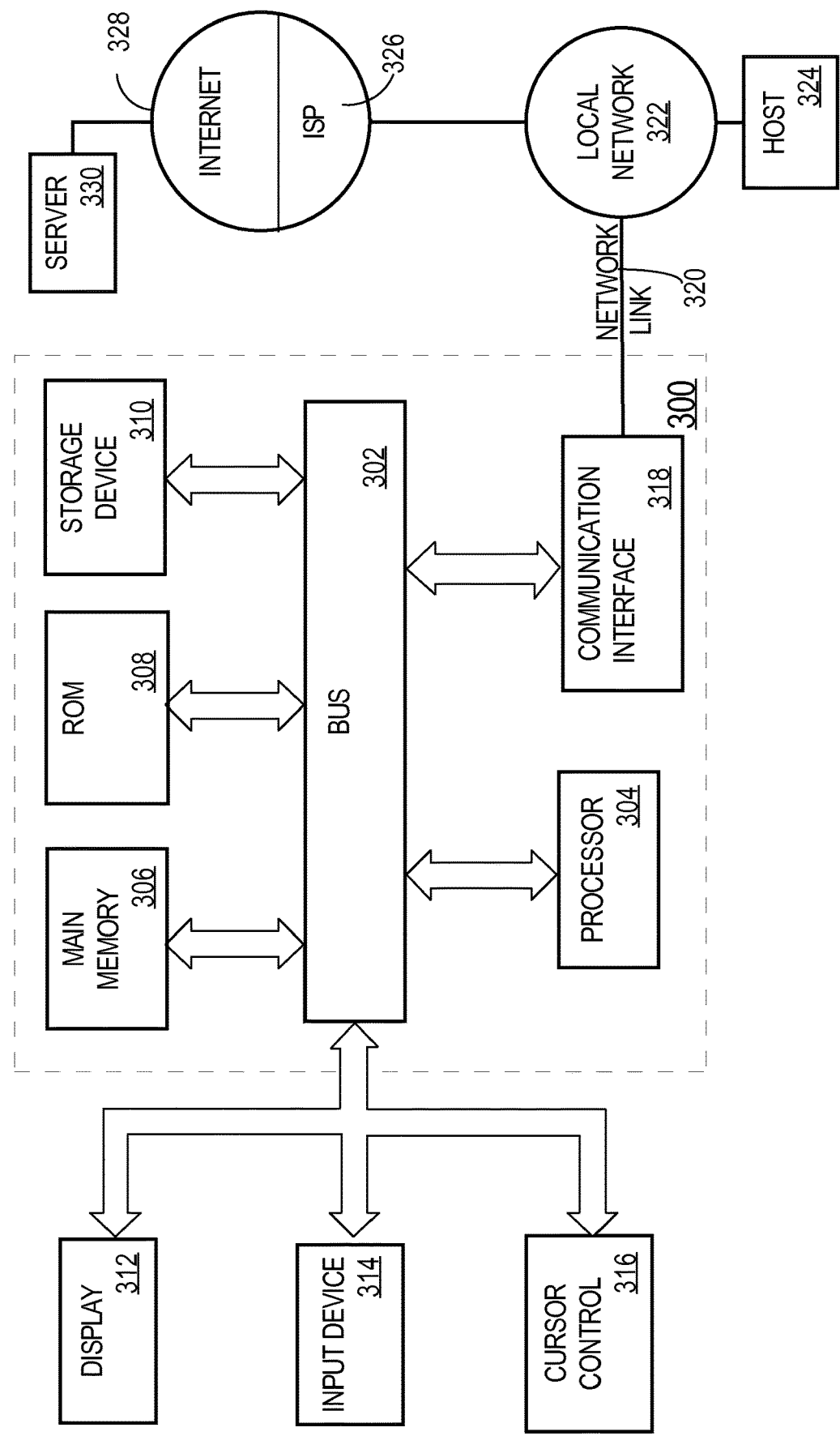
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving an element level heatmap for a database, wherein the element level heatmap comprises access statistics for a plurality of elements within a most recent time window;
    obtaining information about one or more knapsack-algorithm-selection factors, wherein the one or more knapsack-algorithm-selection factors include at least one of:
    free memory available;
    a capacity of an in-memory store;
    a quantity of the plurality of elements;
    an on-disk size of the plurality of elements;
    an uncompressed size of the plurality of elements;
    a projected size of the plurality of elements within the in-memory store; and
    an estimated execution time of a knapsack algorithm;
    automatically selecting a single knapsack algorithm, of a plurality of available knapsack algorithms based on the one or more knapsack-algorithm-selection factors;
    wherein the steps of obtaining information and selecting the single knapsack algorithm are performed prior to executing any of the plurality of available knapsack algorithms based on the element level heatmap;
    based at least on the element level heatmap, using the single selected knapsack algorithm to assign to each of the plurality of elements a value;
    wherein the value assigned by the single selected knapsack algorithm to each element reflects:
        a projected performance benefit for being in the in-memory store, and
        a cost based on a projected size in the in-memory store;
    based on the values assigned by the single selected knapsack algorithm, choosing a set of elements, from the plurality of elements, for inclusion in an optimized configuration of the in-memory store;
    scheduling one or more tasks to convert a present configuration of the in-memory store to the optimized configuration; and
    wherein the method is performed by one or more computing devices.

2. The method of claim 1 wherein:
    the method further comprises selecting a performance model; and
    the value assigned to each of the plurality of elements is based on the element level heatmap, the single selected knapsack algorithm, and the performance model.

3. The method of claim 1, wherein the element level heatmap is a segment level heatmap, and wherein the plurality of elements corresponds to segments of the database.

4. The method of claim 1, wherein each of the plurality of elements is marked in the database as a candidate for the in-memory store.

5. The method of claim 1, wherein the receiving of the element level heatmap is in response to at least one of: receiving a periodic wakeup or determining that the in-memory store is empty.

6. The method of claim 1, wherein the in-memory store is an in-memory columnar store (IMCS).

7. The method of claim 1, wherein the one or more knapsack-algorithm-selection factors comprise two or more facts, and include at least one of:
    free memory available;
    a capacity of the in-memory store; and
wherein the one or more knapsack-algorithm-selection factors additionally include at least one of:
    a quantity of the plurality of elements;
    an on-disk size of the plurality of elements;
    an uncompressed size of the plurality of elements;
    a projected size of the plurality of elements within the in-memory store; and
    an estimated execution time of the single selected knapsack algorithm.

8. The method of claim 1, wherein the optimized configuration is initially based on evaluating one or more user defined policies for at least one element of the database.

9. A method comprising:
    receiving an element level heatmap for a database, wherein the element level heatmap comprises access statistics for a plurality of elements within a most recent time window;
    selecting a knapsack algorithm from a plurality of available knapsack algorithms, according to one or more factors, wherein the one or more factors include at least one of:
    free memory available;
    a capacity of an in-memory store;
    a quantity of the plurality of elements;
    an on-disk size of the plurality of elements;
    an uncompressed size of the plurality of elements;
    a projected size of the plurality of elements within the in-memory store; and
    an estimated execution time of the knapsack algorithm;
    based at least on the element level heatmap, using the knapsack algorithm to assign to each of the plurality of elements a value;
    wherein the value assigned by the knapsack algorithm to each element reflects:
        a projected performance benefit for being in the in-memory store, and
        a cost based on a projected size in the in-memory store;
    based on the values assigned by the knapsack algorithm, choosing a set of elements, from the plurality of elements, for inclusion in an optimized configuration of the in-memory store;

scheduling one or more tasks to convert a present configuration of the in-memory store to the optimized configuration, wherein the scheduling of the one or more tasks coordinates eviction tasks to be followed by insertion tasks; and wherein the method is performed by one or more computing devices.

10. The method of claim 1, wherein the one or more tasks include at least one of:
adding a particular element from the set of elements into the in-memory store;
evicting a stale element from the in-memory store, wherein the stale element is not in the set of elements; and
converting an existing element in the in-memory store to a specific compression level.

11. The method of claim 1, wherein the single selected knapsack algorithm further specifies an optimal compression level for each of the plurality of elements.

12. The method of claim 1, wherein the single selected knapsack algorithm is selected from one of: dynamic programming and multi-path greedy selection.

13. The method of claim 1, wherein the element level heatmap comprises time periods in a histogram, wherein the single selected knapsack algorithm applies a weighting coefficient to each of the time periods in the histogram, and wherein the weighting coefficient is larger for a more recent time period.

14. The method of claim 1, wherein the access statistics are aggregated over the most recent time window.

15. The method of claim 1, wherein the access statistics include at least one of:
a last accessed time;
a last modified time;
a number of accesses;
a number of updates;
a number of full table scan operations;
a number of index lookups; and
a number of row lookups.

16. The method of claim 15, wherein the value is further based on a ratio of the number of accesses to the number of updates.

17. The method of claim 1, wherein the cost of each of the plurality of elements is further based on at least one of: a projected execution time to convert each of the plurality of elements into a suitable data format for the in-memory store, and a projected execution time to compress each of the plurality of elements into a specific compression level.

18. The method of claim 1, further comprising:
communicating the optimized configuration to one or more remote database instances to cause a synchronization at the one or more remote database instances.

19. A non-transitory computer-readable medium storing one or more sequences of instructions which, when executed by one or more processors, cause performing of:
receiving an element level heatmap for a database, wherein the element level heatmap comprises access statistics for a plurality of elements within a most recent time window;
obtaining information about one or more knapsack-algorithm-selection factors, wherein the one or more knapsack-algorithm-selection factors include at least one of:
free memory available;
a capacity of an in-memory store;
a quantity of the plurality of elements;
an on-disk size of the plurality of elements;
an uncompressed size of the plurality of elements;
a projected size of the plurality of elements within the in-memory store; and
an estimated execution time of a knapsack algorithm;
automatically selecting a single knapsack algorithm, of a plurality of available knapsack algorithms based on the one or more knapsack-algorithm-selection factors;
wherein the steps of obtaining information and selecting the single knapsack algorithm are performed prior to executing any of the plurality of available knapsack algorithms based on the element level heatmap;
based at least on the element level heatmap, using the single selected knapsack algorithm to assign to each of the plurality of elements a value;
wherein the value assigned by the single selected knapsack algorithm to each element reflects:
a projected performance benefit for being in the in-memory store, and
a cost based on a projected size in the in-memory store;
based on the values assigned by the single selected knapsack algorithm, choosing a set of elements, from the plurality of elements, for inclusion in an optimized configuration of the in-memory store;
scheduling one or more tasks to convert a present configuration of the in-memory store to the optimized configuration.

20. The non-transitory computer-readable medium of claim 19, wherein the in-memory store is an in-memory columnar store (IMCS).

21. A database management system comprising:
a memory including an in-memory store; and
one or more computing devices, each computing device comprising at least one processor;
the database management system being configured to:
receive an element level heatmap for a database, wherein the element level heatmap comprises access statistics for a plurality of elements within a most recent time window;
obtain information about one or more knapsack-algorithm-selection factors, wherein the one or more knapsack-algorithm-selection factors include at least one of:
free memory available;
a capacity of an in-memory store;
a quantity of the plurality of elements;
an on-disk size of the plurality of elements;
an uncompressed size of the plurality of elements;
a projected size of the plurality of elements within the in-memory store; and
an estimated execution time a the knapsack algorithm;
automatically select a single knapsack algorithm, of a plurality of available knapsack algorithms based on the one or more knapsack-algorithm-selection factors;
wherein the steps of obtaining information and selecting the single knapsack algorithm are performed prior to executing any of the plurality of available knapsack algorithms based on the element level heatmap;
based at least on the element level heatmap, use the single selected knapsack algorithm to assign to each of the plurality of elements a value;
wherein the value assigned by the single-selected knapsack algorithm to each element reflects:
a projected performance benefit for being in the in-memory store, and a cost based on a projected size in the in-memory store;

based on the values assigned by the single selected knapsack algorithm, choose a set of elements, from the plurality of elements, for inclusion in an optimized configuration of the in-memory store;

schedule one or more tasks to convert a present configuration of the in-memory store to the optimized configuration.

22. The database management system of claim 21 wherein the scheduling of the one or more tasks coordinates eviction tasks to be followed by insertion tasks.

23. The database management system of claim 21 wherein the single selected knapsack algorithm further specifies an optimal compression level for each of the plurality of elements.

24. The database management system of claim 21 wherein the cost of each of the plurality of elements is further based on at least one of: a projected execution time to convert each of the plurality of elements into a suitable data format for the in-memory store, and a projected execution time to compress each of the plurality of elements into a specific compression level.

25. The database management system of claim 21 wherein the one or more computing devices are further configured to:

communicate the optimized configuration to one or more remote database instances to cause a synchronization at the one or more remote database instances.

26. The computer readable medium of claim 19 wherein the scheduling of the one or more tasks coordinates eviction tasks to be followed by insertion tasks.

27. The computer readable medium of claim 19 wherein the single selected knapsack algorithm further specifies an optimal compression level for each of the plurality of elements.

28. The computer readable medium of claim 19 wherein the cost of each of the plurality of elements is further based on at least one of: a projected execution time to convert each of the plurality of elements into a suitable data format for the in-memory store, and a projected execution time to compress each of the plurality of elements into a specific compression level.

29. The computer readable medium of claim 19 wherein the one or more computing devices are further configured to:

communicate the optimized configuration to one or more remote database instances to cause a synchronization at the one or more remote database instances.

* * * * *

UNITED STATES PATENT AND TRADEMARK OFFICE
CERTIFICATE OF CORRECTION

PATENT NO. : 10,838,933 B2
APPLICATION NO. : 14/922086
DATED : November 17, 2020
INVENTOR(S) : Marwah et al.

Page 1 of 1

It is certified that error appears in the above-identified patent and that said Letters Patent is hereby corrected as shown below:

In the Claims

In Column 22, Line 50, in Claim 21, delete "a the" and insert -- of the --, therefor.

In Column 24, Line 4, in Claim 26, delete "computer readable medium" and insert -- non-transitory computer-readable medium --, therefor.

In Column 24, Line 7, in Claim 27, delete "computer readable medium" and insert -- non-transitory computer-readable medium --, therefor.

In Column 24, Line 11, in Claim 28, delete "computer readable medium" and insert -- non-transitory computer-readable medium --, therefor.

In Column 24, Line 19, in Claim 29, delete "computer readable medium" and insert -- non-transitory computer-readable medium --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*